United States Patent
Edwards et al.

(10) Patent No.: US 10,586,136 B2
(45) Date of Patent: *Mar. 10, 2020

(54) PROTECTING PRIVATE INFORMATION PROVIDED ON A TRANSACTION CARD AND/OR A DOCUMENT WITH A REFLECTIVE ELEMENT

(71) Applicant: Capital One Services, LLC, McLean, VA (US)

(72) Inventors: Joshua Edwards, Philadelphia, PA (US); Abdelkadar M'Hamed Benkreira, Washington, DC (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,563

(22) Filed: Jul. 19, 2019

(65) Prior Publication Data
US 2019/0340475 A1    Nov. 7, 2019

Related U.S. Application Data

(63) Continuation of application No. 16/280,646, filed on Feb. 20, 2019, now Pat. No. 10,366,314, which is a continuation of application No. 16/136,982, filed on Sep. 20, 2018, now Pat. No. 10,242,300, which is a
(Continued)

(51) Int. Cl.
*G06K 19/04* (2006.01)
*B42D 25/30* (2014.01)
*G06K 19/02* (2006.01)

(52) U.S. Cl.
CPC ........... *G06K 19/041* (2013.01); *B42D 25/30* (2014.10); *G06K 19/02* (2013.01)

(58) Field of Classification Search
None
See application file for complete search history.

(56) References Cited

U.S. PATENT DOCUMENTS

| 6,446,865 | B1 | 9/2002 | Holt et al. | |
| 10,095,964 | B1 * | 10/2018 | Edwards | G06K 19/041 |
| 10,242,300 | B1 * | 3/2019 | Edwards | B42D 25/30 |

(Continued)

FOREIGN PATENT DOCUMENTS

EP    0439092 A2    7/1991

OTHER PUBLICATIONS

Extended European Search Report for Application No. EP19159117.1, dated May 7, 2019, 7 pages.
(Continued)

*Primary Examiner* — Kristy A Haupt
(74) *Attorney, Agent, or Firm* — Harrity & Harrity, LLP

(57) ABSTRACT

A transaction card includes a card body, where the card body includes a surface with a first surface area. The surface of the card body includes private information that encompasses a second surface area of the surface, and the second surface area is less than the first surface area. The transaction card includes a reflective element that is applied to the surface of the card body, and includes a third surface area. The third surface area is based on the first surface area or the second surface area, and the third surface area enables the reflective element to reflect light away from the private information.

20 Claims, 12 Drawing Sheets

Related U.S. Application Data continuation of application No. 15/913,549, filed on Mar. 6, 2018, now Pat. No. 10,095,964.

(56) References Cited

U.S. PATENT DOCUMENTS

| | | | |
|---|---|---|---|
| 10,366,314 B1* | 7/2019 | Edwards | G06K 19/02 |
| 2015/0069131 A1* | 3/2015 | Scanlon | B42D 25/425 |
| | | | 235/487 |

OTHER PUBLICATIONS

Zhang M., "Watch Flashback Anti-Paparazzi Clothing Ruin Flash Photographs," Feb. 25, 2015, 9 pages. Retrieved from Internet:[URL:https://petapixel.com/2015/02/25/watch-flashback-anti-paparazzi-clothing-ruin-flash-photographs/].

* cited by examiner

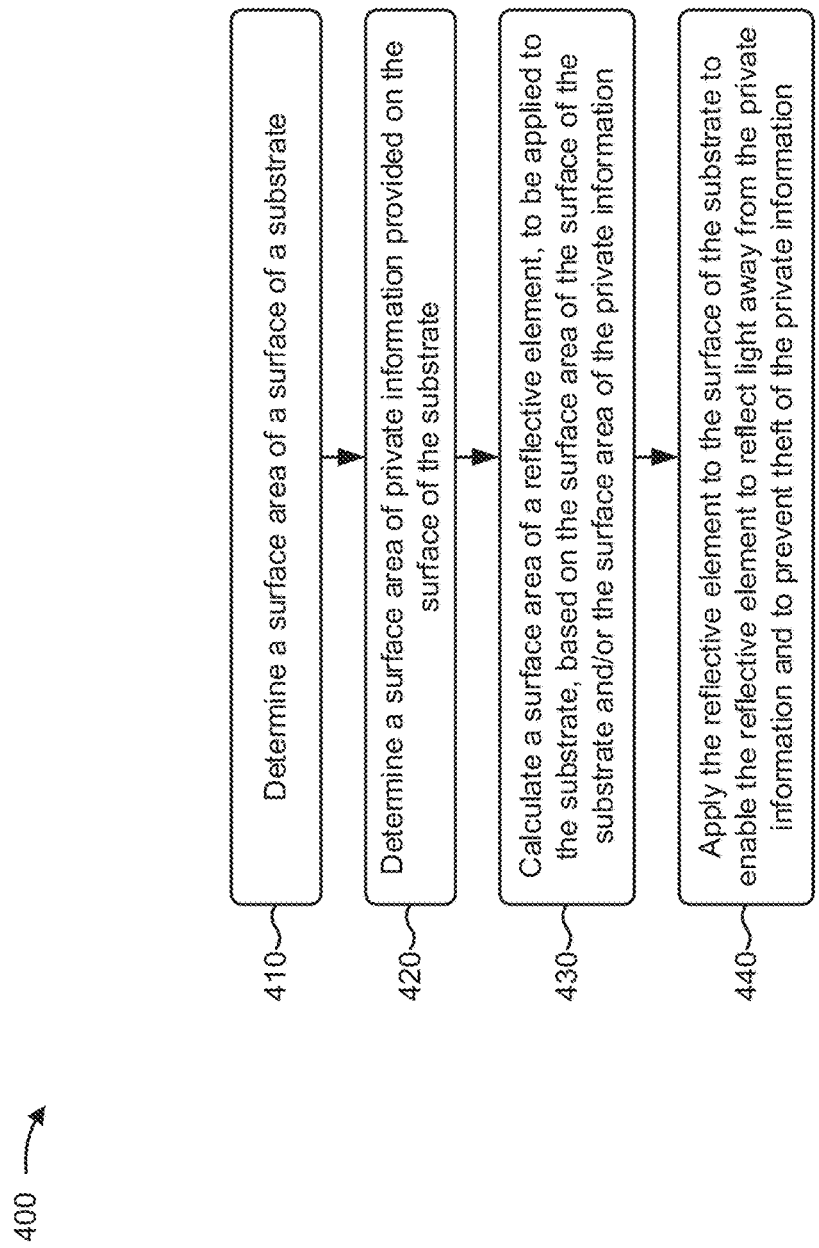

US 10,586,136 B2

PROTECTING PRIVATE INFORMATION PROVIDED ON A TRANSACTION CARD AND/OR A DOCUMENT WITH A REFLECTIVE ELEMENT

RELATED APPLICATION

This application is a continuation of U.S. patent application Ser. No. 16/280,646, filed Feb. 20, 2019 (now U.S. Pat. No. 10,366,314), which is a continuation of U.S. patent application Ser. No. 16/136,982, filed Sep. 20, 2018 (now U.S. Pat. No. 10,242,300), which is a continuation of U.S. patent application Ser. No. 15/913,549, filed Mar. 6, 2018 (now U.S. Pat. No. 10,095,964), which are incorporated herein by reference.

BACKGROUND

One of the easiest and fastest ways to steal transaction card information (e.g., a credit card number), when in physical proximity to the transaction card, is to capture an image of the transaction card with an image capture device (e.g., a smartphone with a camera). This is faster than writing down the transaction card information, and thus is easier to do without being noticed. In certain scenarios (e.g., when the transaction card is located in a background of an image), a person may be able to capture an image of the transaction card without arousing suspicion. Furthermore, confidential information provided in a document may be easily copied by someone gaining access to the document and capturing an image of the document with an image capture device.

SUMMARY

According to some implementations, a transaction card may include a card body, and the card body may include a surface with a first surface area. The surface of the card body may include private information that encompasses a second surface area of the surface, and the second surface area may be less than the first surface area. The transaction card may include a reflective element, and the reflective element may be applied to the surface of the card body. The reflective element may include a third surface area. The third surface area may be based on the first surface area or the second surface area, and the third surface area may enable the reflective element to reflect light away from the private information.

According to some implementations, a document may include a document substrate, and the document substrate may include a surface with a first surface area. The surface of the document substrate may include private information that encompasses a second surface area of the surface, and the second surface area may be less than the first surface area. The document may include a reflective element, and the reflective element may be applied to the surface of the document substrate or embedded within the document substrate. The reflective element may include a third surface area, and the third surface area may be based on the first surface area or the second surface area. The third surface area may enable the reflective element to reflect light away from the private information.

According to some implementations, a method may include determining a first surface area of a surface of a substrate. The substrate may include a body of a transaction card or paper of a document, and the surface of the substrate may include private information that encompasses a second surface area of the surface. The method may include determining the second surface area, and the second surface area may be less than the first surface area. The method may include calculating a third surface area of a reflective element to be applied to the substrate, where the third surface area may be calculated based on the first surface area or the second surface area. The method may include applying the reflective element to the surface of the substrate, where the reflective element may reflect light away from the private information.

BRIEF DESCRIPTION OF THE DRAWINGS

FIGS. 1A-1I are diagrams of an overview of an example implementation described herein;

FIG. 4 is a flow chart of an example process for protecting private information provided on a transaction card and/or a document with a reflective element.

DETAILED DESCRIPTION

The following detailed description of example implementations refers to the accompanying drawings. The same reference numbers in different drawings may identify the same or similar elements.

A person may be prevented from capturing an image of a transaction card by not permitting the person access to the transaction card. However, preventing people from gaining access to a transaction card is not possible when the transaction card needs to be used for a transaction (e.g., paying a bill at a restaurant, a bar, and/or the like). A person can be prevented from capturing an image of a document by providing adequate security for the document (e.g., preventing access to the document via surveillance systems, secure facilities, and/or the like). However, preventing people from gaining access to a document is not possible when the people illegally gain access to the document.

Some implementations described herein may protect private information provided on a transaction card and/or a document with a reflective element. For example, a transaction card may include a card body and a reflective element. The card body may include a surface with a first surface area, and the surface of the card body may include private information that encompasses a second surface area of the surface. The reflective element may be applied to the surface of the card body, and may include a third surface area. The third surface area may enable the reflective element to reflect light away from the private information. In another example, a document may include a document substrate and a reflective element. The document substrate may include a surface with a first surface area, and the surface of the document substrate may include private information that encompasses a second surface area of the surface. The reflective element may be applied to the surface of the document substrate or embedded within the document substrate, and may include a third surface area. The third surface area may enable the reflective element to reflect light away from the private information.

Figure 1A:
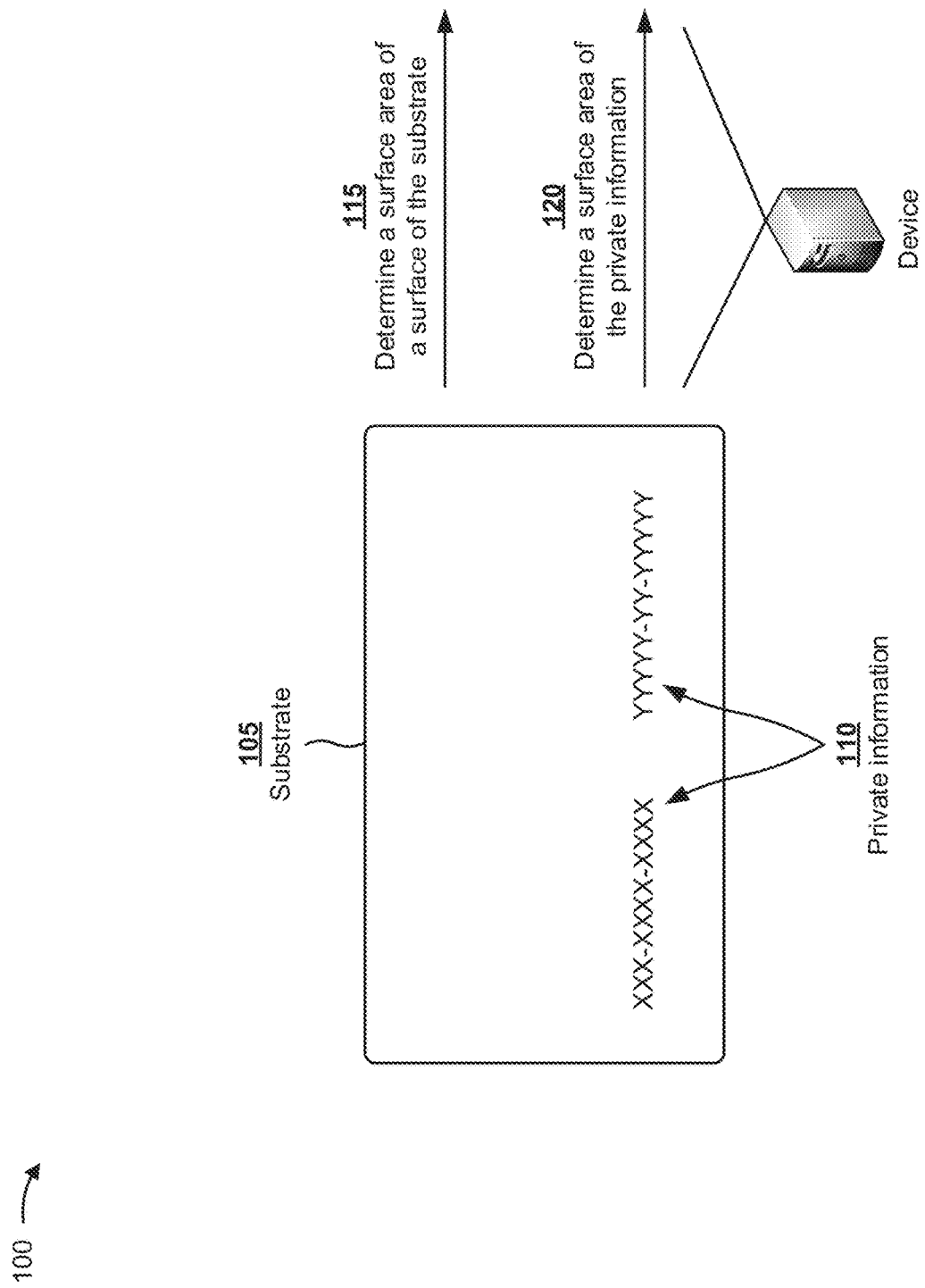

FIGS. 1A-1I are diagrams of an overview of an example implementation 100 described herein. As shown in FIG. 1A, and by reference numbers 105 and 110, a substrate with private information may be associated with a device. In some implementations, the substrate may include any object that includes private information. For example, the substrate may include a transaction card (e.g., a credit card, a debit card, a gift card, an automated teller machine (ATM) card, a rewards card, a client loyalty card, and/or the like), a social security card, an insurance card, a driver's license, a passport, a document, and/or the like. In some implementations, the private information may include an account number associated with a transaction card, a name associated with a transaction card, an expiration date associated with a transaction card, a card verification value (CVV) or a card verification code (CVC) associated with a transaction card, a social security number associated with a social security card, a name associated with a social security card, an account identifier associated with an insurance card, a name associated with an insurance card, a group identifier associated with an insurance card, a driver's license number associated with a driver's license, a picture associated with a passport, a name associated with a passport, a passport number associated with a passport, trade secret information, intellectual property information, financial information, customer lists, and/or the like.

As further shown in FIG. 1A, and by reference number 115, the device may determine a surface area of a surface of the substrate. In some implementations, the device may include a sensor (e.g., an optical sensor, an ultrasonic sensor, and/or the like) to measure a length and a width of the surface of the substrate, and may determine the surface area of the surface of the substrate based on the length and the width measured by the sensor. In some implementations, the sensor may be separate from the device. In such implementations, the device may receive, from the sensor, information indicating a length and a width of the surface of the substrate, and may determine the surface area of the surface of the substrate based on the length and the width received from the sensor.

As further shown in FIG. 1A, and by reference number 120, the device may determine a surface area of the private information. In some implementations, the device may include a sensor (e.g., an optical sensor, an ultrasonic sensor, and/or the like) to measure one or more lengths and widths of the private information, and may determine the surface area of the private information based on the one or more lengths and widths measured by the sensor. In some implementations, the sensor may be separate from the device. In such implementations, the device may receive, from the sensor, information indicating one or more lengths and widths of the private information, and may determine the surface area of the private information based on the one or more lengths and widths received from the sensor.

In some implementations, the surface area of the surface of the substrate and the surface area of the private information may be predetermined based on manufacturing specifications of the substrate with the private information. In such implementations, the device may determine the surface area of the surface of the substrate and the surface area of the private information based on the manufacturing specifications or by looking up the information in a data structure.

Figure 1B:
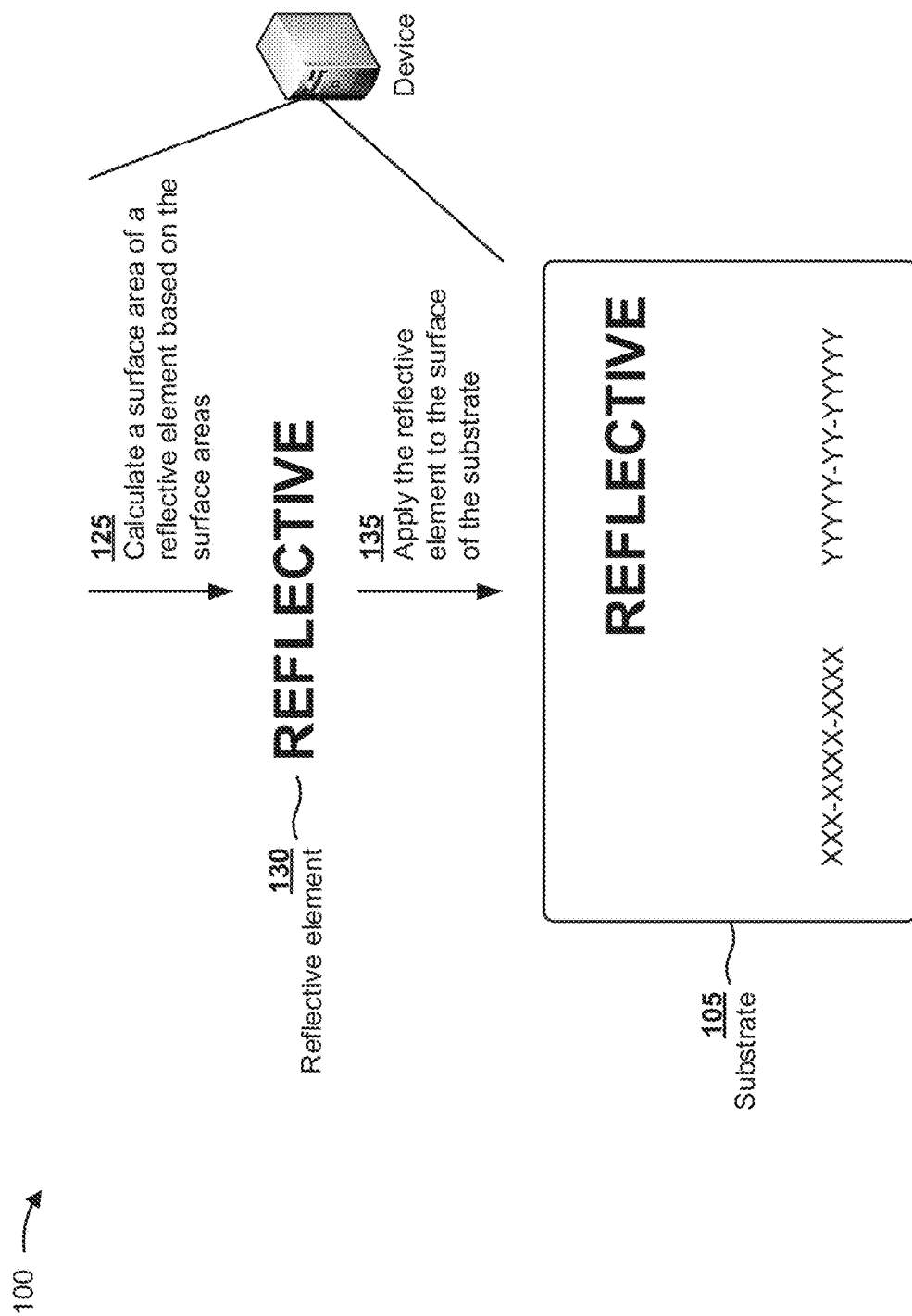

As shown in FIG. 1B, and by reference number 125, the device may calculate a surface area of a reflective element, to be applied to the substrate, based on the surface area of the surface of the substrate and/or the surface area of the private information. In some implementations, the reflective element may include textual information (e.g., a name of an entity associated with a transaction card, a name of an entity associated with a document, a textual logo of an entity associated with a transaction card or a document, and/or the like), graphical information (e.g., a graphical logo of an entity associated with a transaction card or a document, an image, and/or the like), a combination of textual information and graphical information, and/or the like.

In some implementations, the reflective element may include a material that reflects light away from areas around the reflective element. In such implementations, and when the reflective element is applied to a portion of the substrate, the reflective element may include a material that reflects light away from portions of the substrate (e.g., including the private information) other than the portion of the substrate where the reflective element is applied. For example, the reflective element may include biaxially oriented polyethylene terephthalate, aluminum, reflective micro-glass beads, titanium dioxide, zinc oxide, lithopone, and/or the like.

Biaxially-oriented polyethylene terephthalate (also known as Mylar®) is a polyester film made from stretched polyethylene terephthalate. Aluminum is a chemical element that is a soft, nonmagnetic, ductile metal in the boron group. Reflective micro-glass beads are glass microspheres that cause a surface to reflect light back to a source of the light. Titanium dioxide, also known as titanium(IV) oxide or titania, is the naturally occurring oxide of titanium. Zinc oxide is an inorganic compound that occurs naturally as the mineral zincite, but may be produced synthetically. Lithopone is a mixture of inorganic compounds, composed of a mixture of (e.g., produced by co-precipitation of) barium sulfate and zinc sulfide. In some implementations, the material for the reflective element may be selected based on cost, ease of application, durability, and/or the like.

In some implementations, the calculated surface area of the reflective element may depend on a distance between the reflective element and the private information, the surface area of the private information, an amount of light expected to be reflected by the reflective element (e.g., an amount of light provided by a flash of an image detection device, an amount of light provided by direct sunlight, and/or the like), and/or the like. In such implementations, the calculated surface area of the reflective element may ensure that the reflective element reflects light away from the private information so that an image capture device may not capture an image of the private information.

As further shown in FIG. 1B, and by reference number 135, the device may apply the reflective element to the surface of the substrate. In some implementations, the device may include a machine that manufactures the substrate and applies the reflective element to the substrate. In some implementations, the device may be associated with a machine that applies the reflective element to the substrate, and may cause the machine to apply the reflective element to the substrate.

In some implementations, the reflective element may be applied to the surface of the substrate by painting the reflective element on the surface of the substrate. In such implementations, the material of the reflective element may initially be in a liquid form so that the reflective element may be painted on the surface of substrate. Once the reflective element is painted on the surface of the substrate, the reflective element may dry and adhere to the surface of the substrate. In some implementations, painting the reflective element on the surface of the substrate may be cost effective, may provide ease of application, may enable efficient manufacturing, and/or the like.

In some implementations, the reflective element may be applied to the surface of the substrate via a hot lamination technique or a cold lamination technique. In such implementations, heat, pressure, welding, and/or adhesives may be applied to adhere the reflective element to the surface of the substrate. For example, a hot lamination technique may include using a heated roll laminator to melt glue extruded onto lamination film. In this case, the lamination film may then be applied to a substrate using pressure rollers. As another example, a cold lamination technique may include using a cold roll laminator to apply a film to the surface of the substrate. In this case, the film may be coated with an adhesive from which a non-adhesive backing is removed before applying the film to the surface of the substrate. In some implementations, applying the reflective element on the surface of the substrate via a hot lamination technique or a cold lamination technique may be cost effective, may provide ease of application, may enable efficient manufacturing, and/or the like.

In some implementations, the reflective element may be applied to the surface of the substrate by screen printing the reflective element on the surface of the substrate. In such implementations, a screen may be used to apply the reflective element to the surface of the substrate. Screen printing is a printing technique whereby, for example, a screen (e.g., a mesh stretched over a frame) is used to transfer a substance (e.g., ink) onto a substrate, except in areas made impermeable to the substance by a blocking stencil. In this case, a blade or squeegee may be moved across the screen to fill the open mesh apertures with the substance, and a reverse stroke may then be used to cause the screen to touch the substrate momentarily along a line of contact. This may cause the substance to wet the substrate and be pulled out of the mesh apertures as the screen springs back after the blade has passed. In some implementations, screen printing the reflective element on the surface of the substrate may be cost effective, may provide ease of application, may enable efficient manufacturing, and/or the like.

In some implementations, the reflective element may be applied to the surface of the substrate by adhering the reflective element on the surface of the substrate. In such implementations, the reflective element may be adhered on the surface of the substrate with an adhesive, such as a natural adhesive (e.g., vegetable starch, a natural resin, and/or the like), a synthetic adhesive (e.g., an elastomer, a thermoplastic, an emulsion, a thermoset, and/or the like), and/or the like. In some implementations, adhering the reflective element on the surface of the substrate may be cost effective, may provide ease of application, may enable efficient manufacturing, and/or the like.

In some implementations, the reflective element may be applied as a watermark in the substrate. A watermark is an image or a pattern in a material, such as an image that appears as various shades of lightness or darkness when viewed by transmitted light (or when viewed by reflected light, atop a dark background), caused by thickness or density variations in the material. In this case, the reflective element may be applied as an image or a pattern in the surface of the substrate. As one example, a dandy roll process may include impressing a water-coated metal stamp onto the material during manufacturing. As another example, a cylinder mold process may include using a roll with areas of relief in the surface of the roll. In some implementations, applying the reflective element on the surface of the substrate as a watermark may be cost effective, may provide ease of application, may enable efficient manufacturing, and/or the like.

In some implementations, the reflective element may be sized in accordance with the calculated surface area of the reflective element, as described elsewhere herein. In some implementations, the reflective element may be applied to the surface of the substrate at a distance from the private information. In such implementations, the distance between the reflective element and private information may ensure that the reflective element reflects light away from the private information so that an image capture device may not capture an image of the private information. In some implementations, the distance may be calculated as a function of a size of the reflective element, a size of the private information, a size of the substrate, the expected light to be reflected by the reflective element, and/or the like.

Figure 1C:
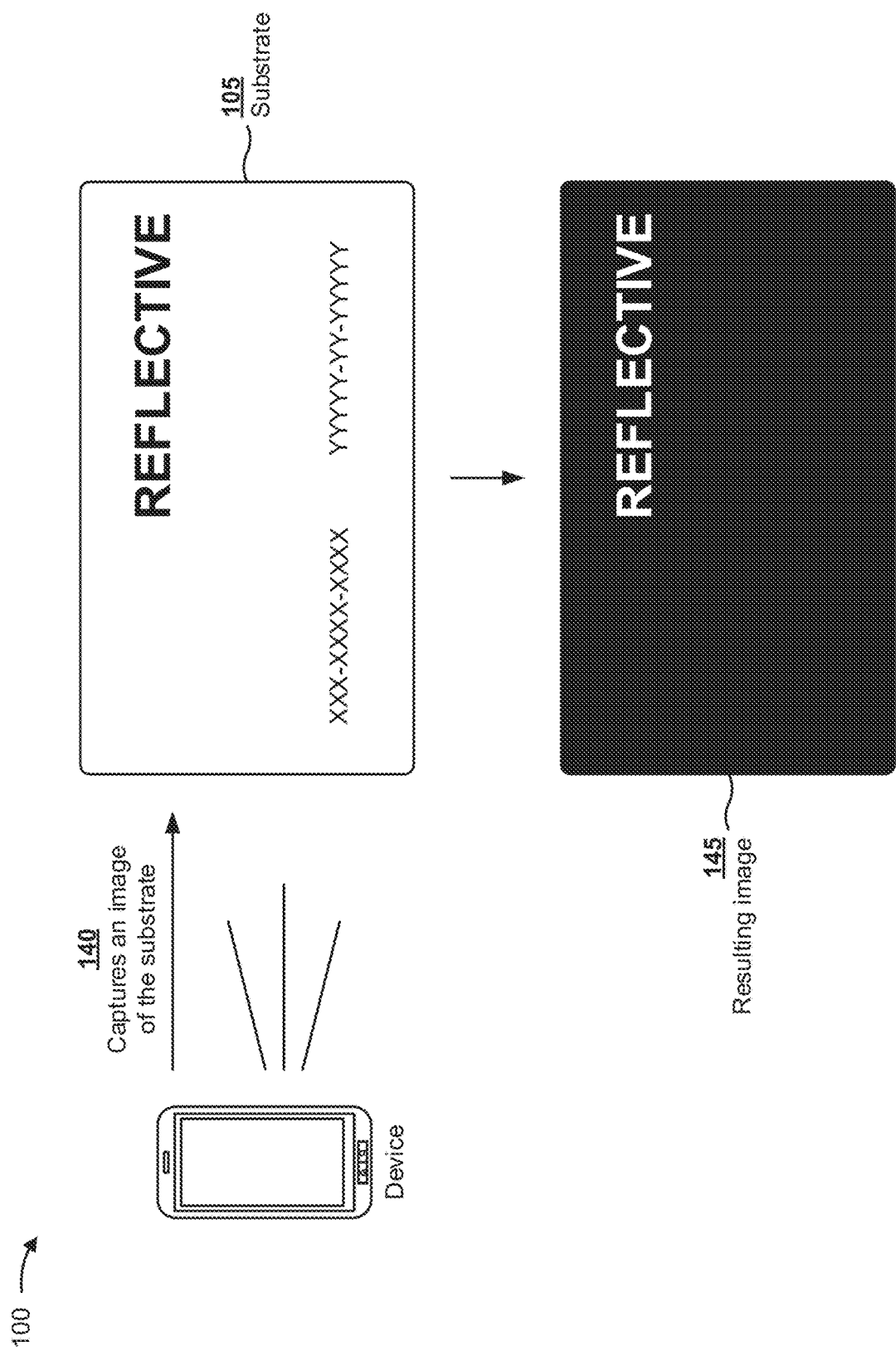

As shown in FIG. 1C, and by reference number 140, assume that another device (e.g., a smartphone with a camera) is utilized to capture an image of the substrate. For example, a user of the smartphone may utilize the camera to capture the image of the substrate. When the image is captured, the reflective element may reflect light away from the private information of the substrate. As further shown in FIG. 1C, and by reference number 145, the image captured by the other device may include a visible image of the reflective element, but may not include an image of the private information (e.g., the private information may be obscured). In this way, the reflective element may ensure that the private information may not be easily obtained by the user of the other device.

Figure 1D:
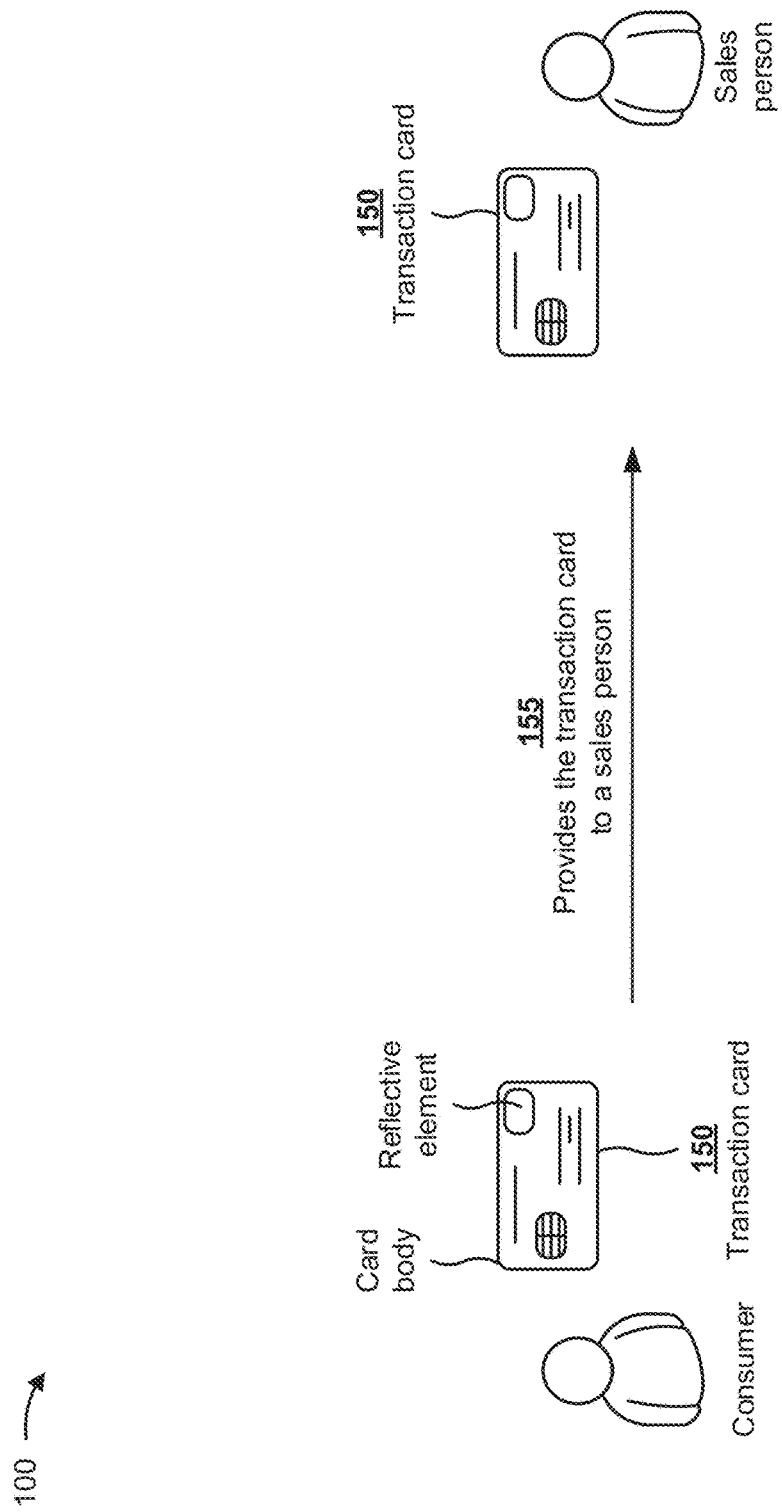

As shown in FIG. 1D, and by reference number 150, assume that the substrate is a transaction card associated with a consumer, and that the transaction card includes a card body with private information (not shown) and a reflective element. Further assume that the consumer is utilizing the transaction card to complete (e.g., pay for) a transaction. As further shown in FIG. 1D, and by reference number 155, the consumer may provide the transaction card to a sales person in order to complete the transaction.

Figure 1E:
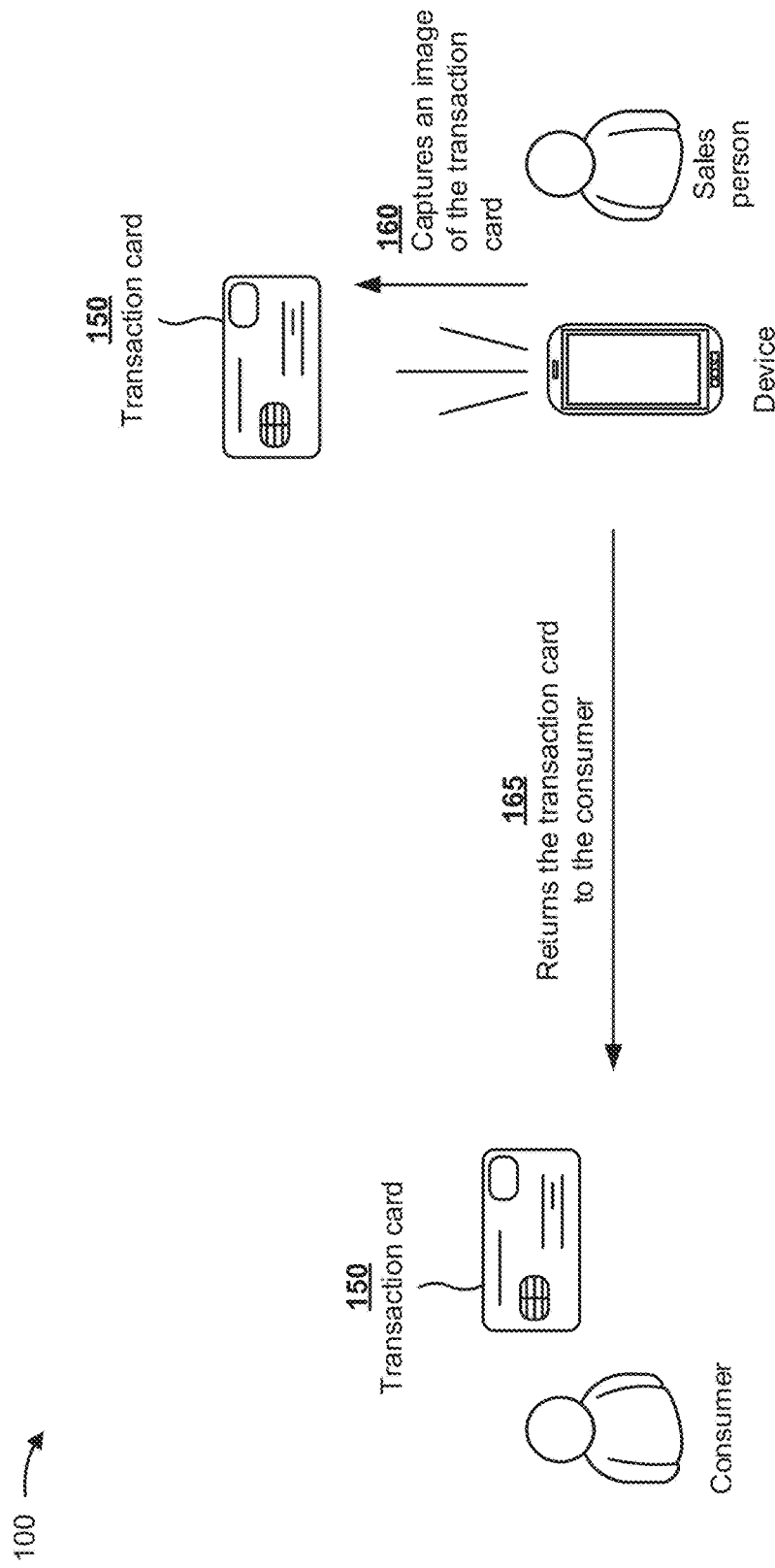

As shown in FIG. 1E, and by reference number 160, assume that the sales person is dishonest and uses a device (e.g., a smartphone with a camera) to capture an image of the transaction card. For example, the sales person may utilize the camera of the smartphone to capture the image of the transaction card (e.g., without the consumer seeing the sales person utilizing the camera). When the image is captured, the reflective element may reflect light away from the private information of the transaction card. As further shown in FIG. 1E, and by reference number 165, the sales person may return the transaction card to the consumer after capturing the image of the transaction card and after completing the transaction (e.g., utilizing the transaction card to pay for the transaction).

Figure 1F:
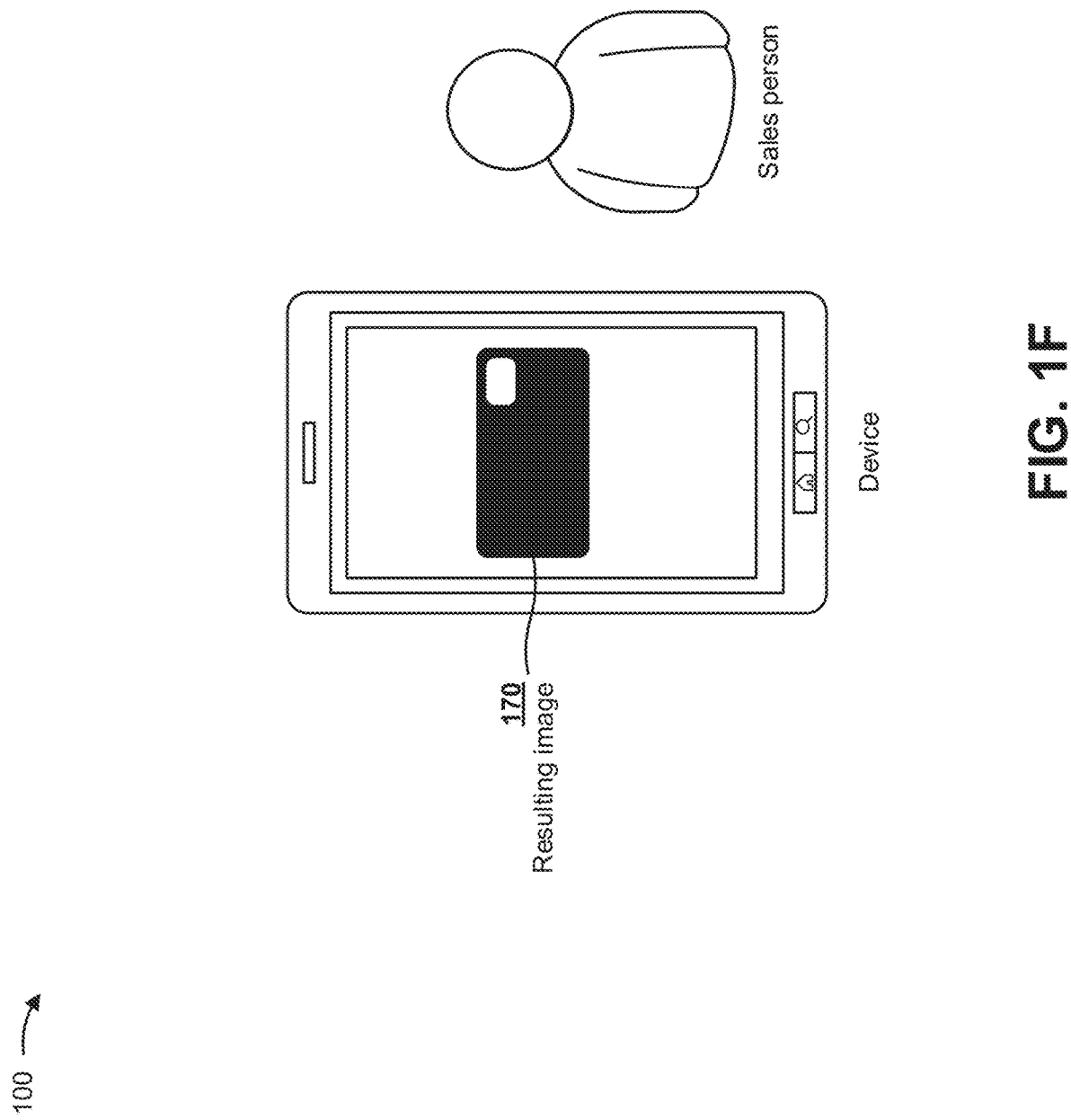

As shown in FIG. 1F, and by reference number 170, when the sales person utilizes the device to view a resulting image of the transaction card, the resulting image may include a visible image of the reflective element, but may not include an image of the private information (e.g., the private information may be obscured) of the transaction card. In this way, the reflective element may ensure that the private information of the transaction card may not be easily obtained by the sales person.

Figure 1G:
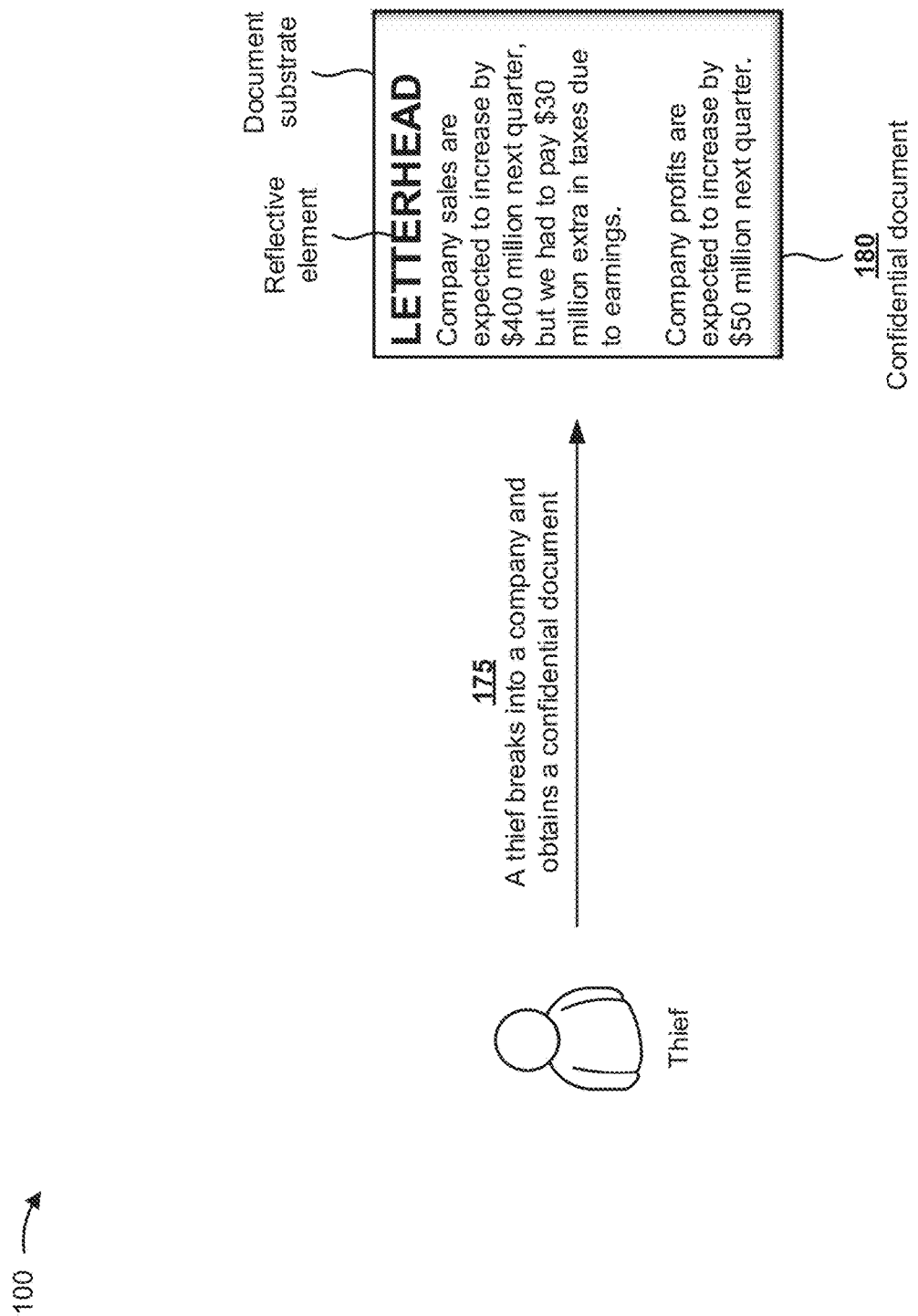

As shown in FIG. 1G, and by reference numbers 175 and 180, assume that a thief breaks into a company and obtains a confidential document. The confidential document may include a document substrate (e.g., paper) with private information (e.g., expected company sales and expected company profits) and a reflective element. Further assume that the thief wishes to capture an image of the confidential document in order to steal the private information.

Figure 1H:
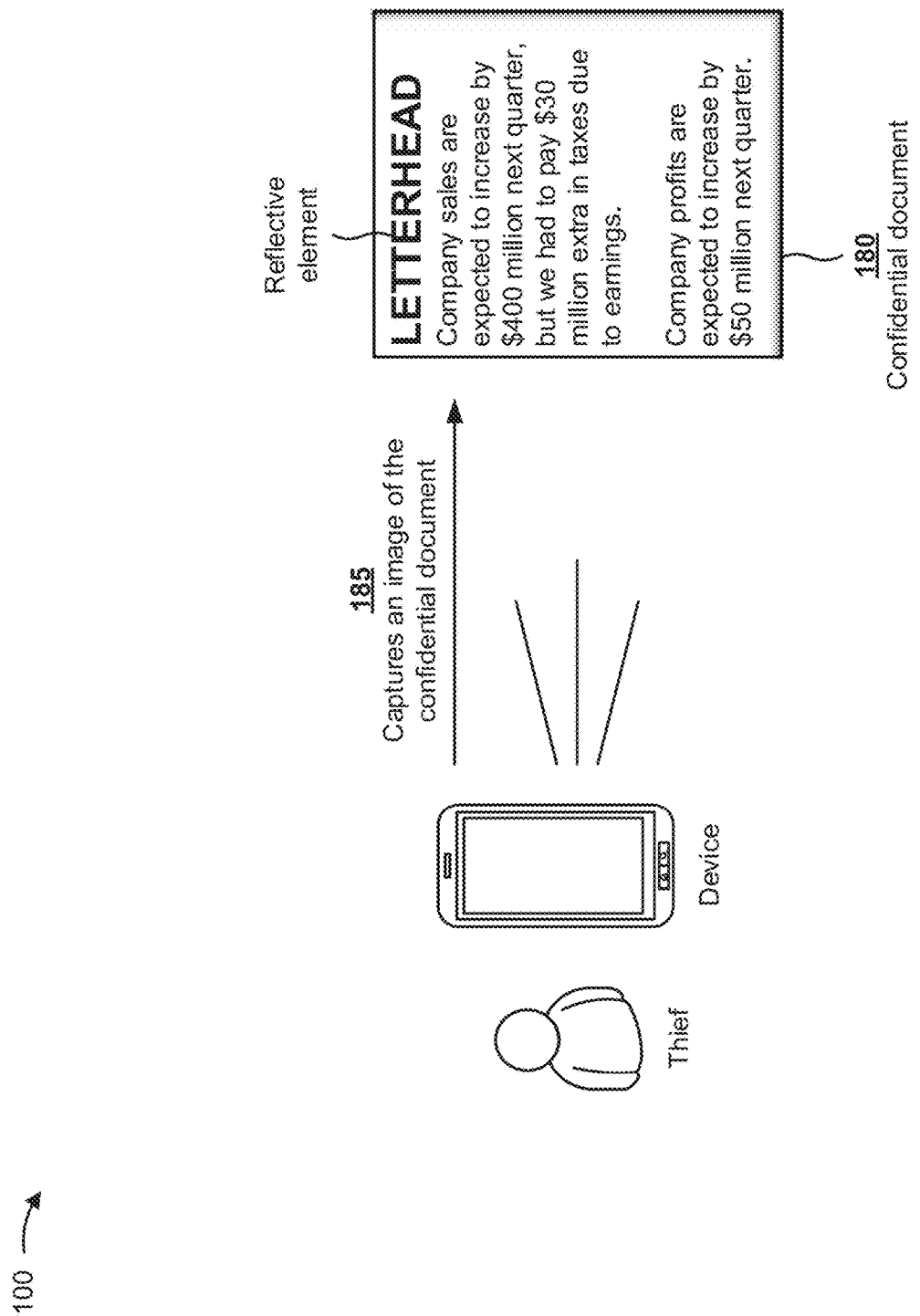
Figure 11:
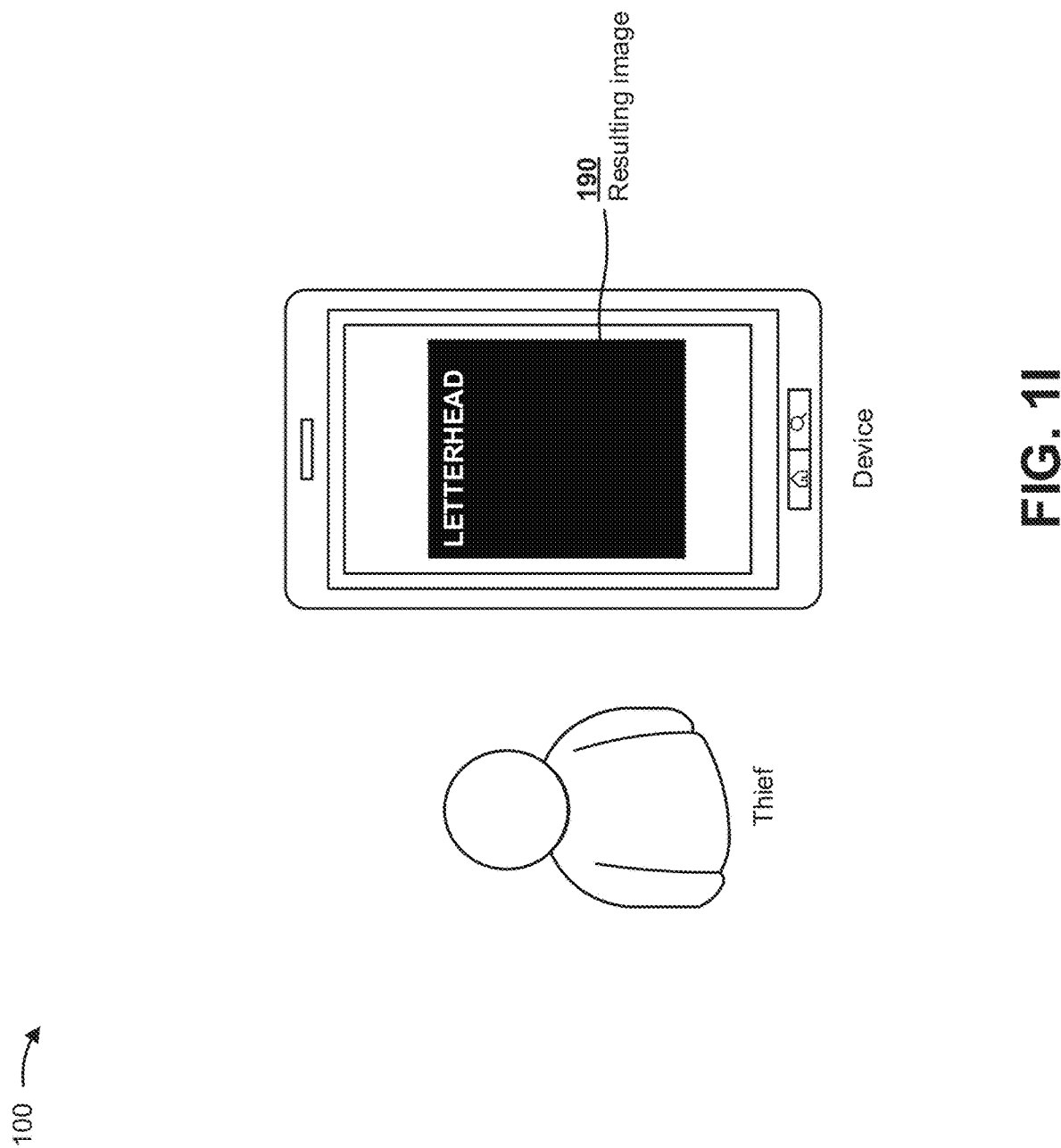

As shown in FIG. 1H, and by reference number 185, the thief may utilize a device (e.g., a smartphone with a camera) to capture an image of the confidential document. For example, the thief may utilize the camera of the smartphone to capture the image of the confidential document. When the image is captured, the reflective element may reflect light away from the private information of the confidential document.

As shown in FIG. 1I, and by reference number 190, when the thief utilizes the device to view a resulting image of the confidential document, the resulting image may include a visible image of the reflective element, but may not include an image of the private information (e.g., the private information may be obscured) of the confidential document. In this way, the reflective element may ensure that the private information of the confidential document may not be easily obtained by the thief.

As indicated above, FIGS. 1A-1I are provided merely as examples. Other examples are possible and may differ from what was described with regard to FIGS. 1A-1I.

Figure 2:
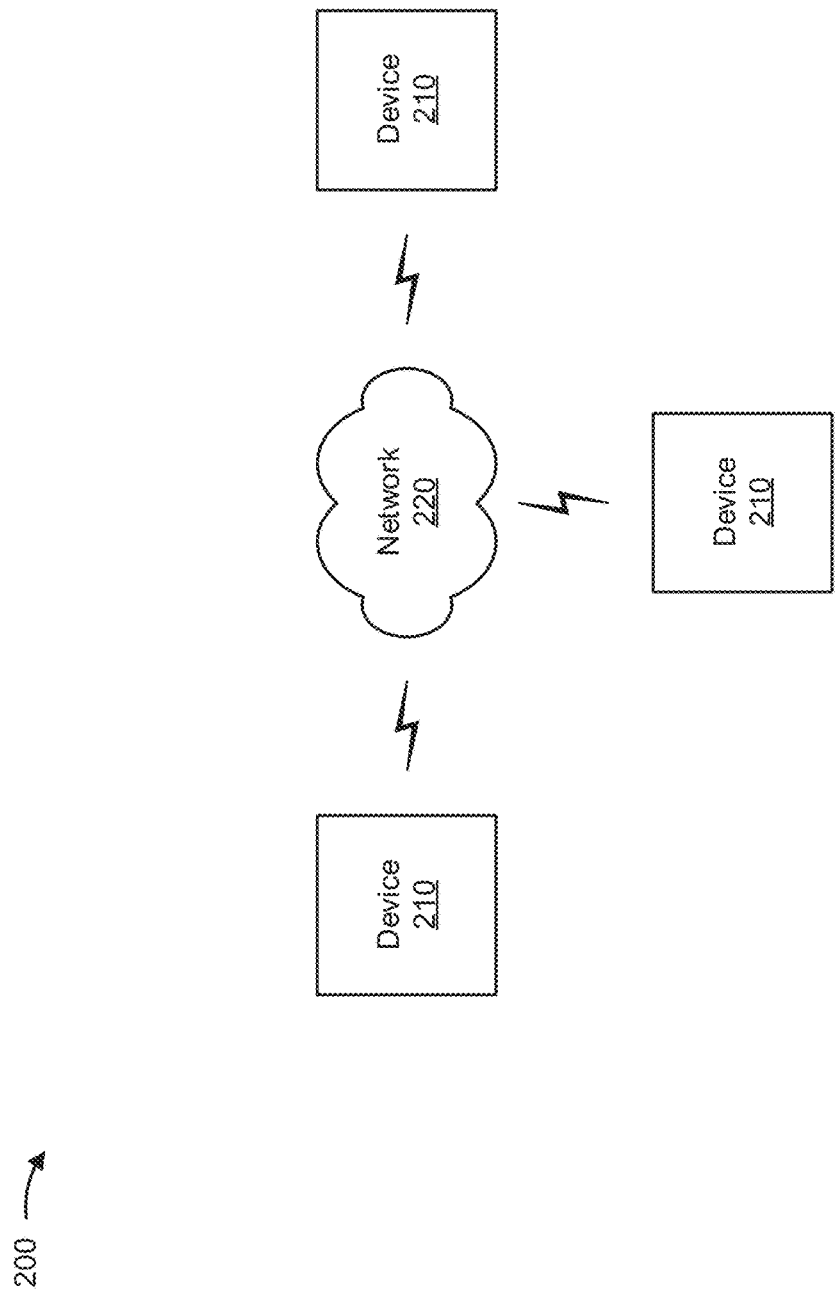
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include multiple devices 210 and a network 220. Devices of environment 200 may interconnect via wired connections, wireless connections, or a combination of wired and wireless connections.

Device 210 includes one or more devices capable of receiving, generating, storing, processing, and/or providing information, such as information described herein. For example, device 210 may include a device, such as a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), a global positioning system (GPS) device, a server device, a group of server devices, a network device (e.g., a firewall, a router, a gateway, a switch, a hub, a bridge, a reverse proxy, a proxy server, a security device, an intrusion detection device, a load balancer, etc.), an image capture device, a video capture device, a device for manufacturing transaction cards or paper, a device for printing documents, or a similar type of device.

In some implementations, device 210 may receive information from and/or transmit information to another device 210 in environment 200. In some implementations, one or more of the functions performed by device 210 may be hosted in a cloud computing environment or may be partially hosted in a cloud computing environment. In some implementations, device 210 may be a physical device implemented within a housing, such as a chassis. In some implementations, device 210 may be a virtual device implemented by one or more computer devices of a cloud computing environment or a data center.

Network 220 includes one or more wired and/or wireless networks. For example, network 220 may include may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
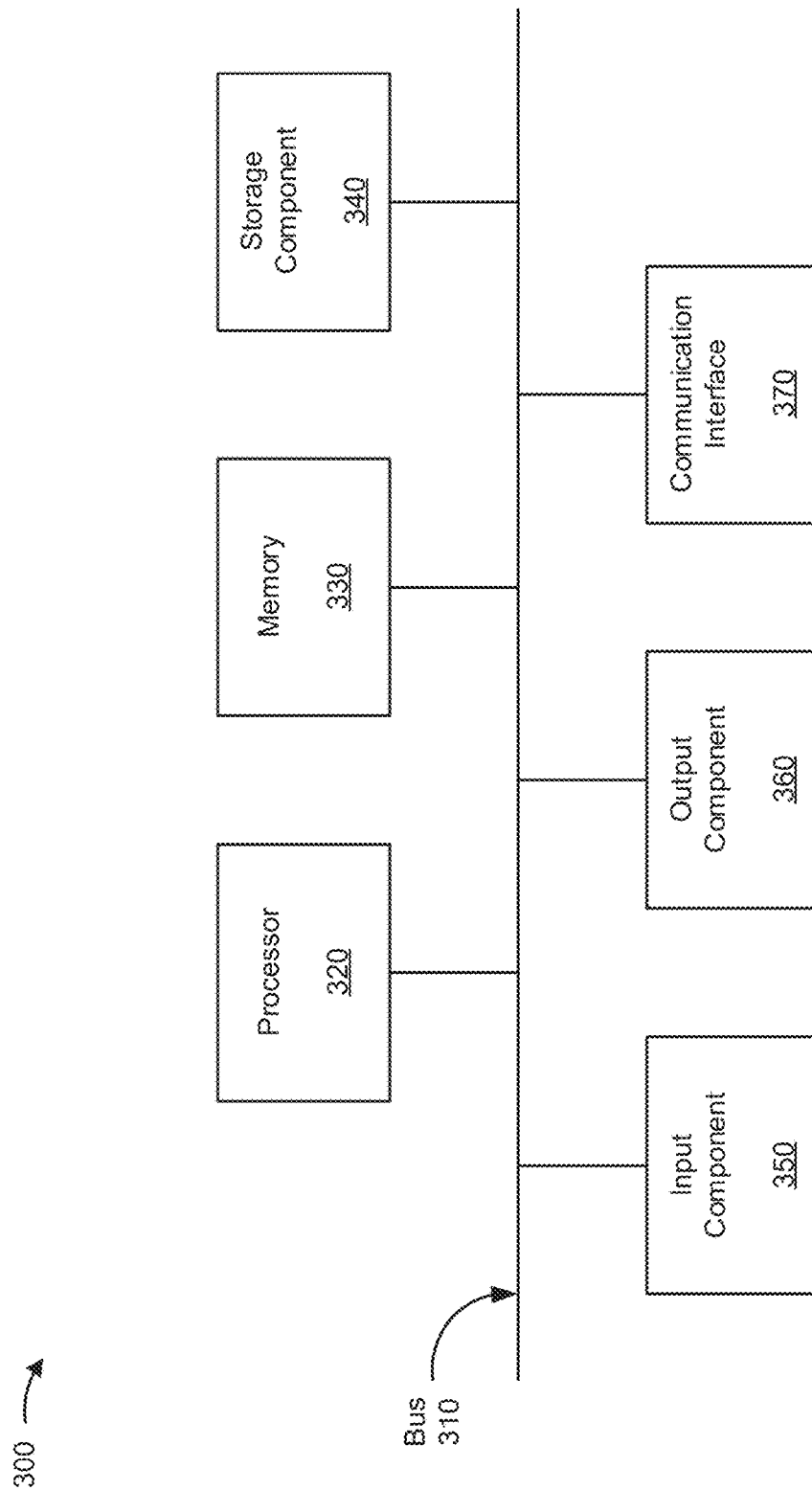
FIG. 3 is a diagrams of example components of one or more devices of FIG. 2.

FIG. 3 is a diagram of example components of a device 300. Device 300 may correspond to device 210. In some implementations, device 210 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for protecting private information provided on a transaction card and/or a document with a reflective element. In some implementations, one or more process blocks of FIG. 4 may be performed by device 210. In some implementations, one or more process blocks of FIG. 4 may be performed by another device or a group of devices separate from or including device 210.

As shown in FIG. 4, process 400 may include determining a surface area of a surface of a substrate (block 410). For example, device 210 (e.g., using processor 320, memory 330, storage component 340, input component 350, and/or the like) may determine a first surface area of a surface of substrate 105, where the substrate may include a body of a transaction card or paper of a document, and the surface of substrate 105 may include private information 110 that encompasses a second surface area of the surface, as described above in connection with FIGS. 1A-1I.

As further shown in FIG. 4, process 400 may include determining a surface area of private information provided on the surface of the substrate (block 420). For example, device 210 (e.g., using processor 320, memory 330, storage component 340, input component 350, and/or the like) may determine the second surface area encompassed by private information 110, and the second surface area may be less than the first surface area, as described above in connection with FIGS. 1A-1I.

As further shown in FIG. 4, process 400 may include calculating a surface area of a reflective element to be applied to the substrate, based on the surface area of the surface of the substrate and/or the surface area of the private information (block 430). For example, device 210 (e.g., using processor 320, memory 330, storage component 340, input component 350, and/or the like) may calculate a third surface area of a reflective element 130 to be applied to substrate 105, and the third surface area may be calculated based on the first surface area and/or the second surface area, as described above in connection with FIGS. 1A-1I.

As further shown in FIG. 4, process 400 may include applying the reflective element to the surface of the substrate to enable the reflective element to reflect light away from the private information and to prevent theft of the private information (block 440). For example, device 210 (e.g., using processor 320, memory 330, storage component 340, input component 350, and/or the like) may apply reflective element 130 to the surface of substrate 105, and reflective element 105 may reflect light away from private information 110, as described above in connection with FIGS. 1A-1I.

Process 400 may include additional implementations, such as any single implementation or any combination of implementations described below.

In some implementations, the reflective element of a transaction card may include biaxially oriented polyethylene terephthalate, aluminum, reflective micro-glass beads, titanium dioxide, zinc oxide, lithopone, and/or the like. In some implementations, the private information, provided on the transaction card, may include a name of a user associated with the transaction card, an account number associated with the transaction card, a card security code associated with the transaction card, an expiration date associated with the transaction card. In some implementations, the reflective element of the transaction card may include an adhesive material for adhering the reflective element to the surface of the card body of the transaction card. In some implementations, the reflective element of the transaction card may include a reflective material that is applied to the surface of the card body of the transaction card. In some implementations, the third surface area of the reflective element may enable the reflective element to prevent an image capture device from capturing an image of the private information. In some implementations, the third surface area is separate from the second surface area.

In some implementations, the reflective element of a confidential document may include biaxially oriented polyethylene terephthalate, aluminum, reflective micro-glass beads, titanium dioxide, zinc oxide, lithopone, and/or the like. In some implementations, the private information, provided on the confidential document, may include financial information associated with an entity, intellectual property information associated with the entity, manufacturing information associated with the entity, operations information associated with the entity, customer information associated with the entity, and/or the like. In some implementations, the reflective element of the confidential document may include an adhesive material for adhering the reflective element to the surface of the document substrate of the confidential document. In some implementations, the reflective element of the confidential document may include a reflective material that is applied to the surface of the document substrate of the confidential document. In some implementations, the reflective element of the confidential document may include a reflective material that is embedded within the document substrate, of the confidential document, as a watermark. In some implementations, the third surface area of the reflective element may enable the reflective element to prevent an image capture device from capturing an image of the private information.

In some implementations, a reflective element of a substrate may include biaxially oriented polyethylene terephthalate, aluminum, reflective micro-glass beads, titanium dioxide, zinc oxide, lithopone, and/or the like. In some implementations, when applying the reflective element to the surface of the substrate, a device may utilize an adhesive material to adhere the reflective element to the surface of the substrate. In some implementations, the reflective element may include a reflective material, and, when applying the reflective element to the surface of the substrate, the device may apply the reflective material to the surface of the substrate. In some implementations, the reflective element may prevent an image capture device from capturing an image of private information. In some implementations, the third surface area may be separate from the second surface area.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein may protect private information, provided on a transaction card and/or a document, using a reflective element. For example, a transaction card may include a card body and a reflective element. The card body may include a surface with a first surface area, and the surface of the card body may include private information that encompasses a second surface area of the surface. The reflective element may be applied to the surface of the card body, and may include a third surface area. The third surface area may enable the reflective element to reflect light away from the private information. In another example, a document may include a document substrate and a reflective element. The document substrate may include a surface with a first surface area, and the surface of the document substrate may include private information that encompasses a second surface area of the surface. The reflective element may be applied to the surface of the document substrate or embedded within the document substrate, and may include a third surface area. The third surface area may enable the reflective element to reflect light away from the private information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a device, a first surface area of a surface of a substrate,
   the substrate including a body of a transaction card or paper of a document;
   determining, by the device, a second surface area of the substrate,
   the second surface area of the substrate including private information;
   calculating, by the device, a third surface area of the substrate based on the first surface area of the substrate and the second surface area of the substrate,
   the third surface area of the substrate being an area of the substrate where a reflective element is to be applied; and
   applying, by the device, the reflective element to the third surface area of the substrate to reflect light away from the private information and to prevent theft of the private information.

2. The method of claim 1, wherein the reflective element includes one or more of:
   biaxially oriented polyethylene terephthalate,
   aluminum,
   reflective micro-glass beads,
   titanium dioxide,
   zinc oxide, or
   lithopone.

3. The method of claim 1, wherein applying the reflective element to the third surface area of the substrate comprises:
   utilizing an adhesive material to adhere the reflective element to the third surface area of the substrate.

4. The method of claim 1, wherein the first surface area is calculated by a sensor.

5. The method of claim 4, wherein the sensor is:
   an optical sensor, or
   an ultrasonic sensor.

6. The method of claim 5, wherein the second surface area of the substrate is at a distance from the third surface area of the substrate,
   the distance is calculated based upon one or more of:
   a size of the reflective element,
   a size of the private information, or
   a size of the substrate.

7. The method of claim 1, wherein the reflective element includes a reflective material; and
   wherein applying the reflective element to the third surface area of the substrate comprises:
   applying the reflective material to the third surface area of the substrate.

8. A transaction card, comprising:
   a card body,
   a surface of the card body including a first surface area and a second surface area that includes private information; and
   a reflective element,
   the reflective element being applied to a third surface area of the surface, the third surface area of the surface being determined based on the first surface area of the surface and the second surface area of the surface, and the reflective element to reflect light away from the private information.

9. The transaction card of claim 8, wherein the reflective element includes one or more of:

biaxially oriented polyethylene terephthalate,
aluminum,
reflective micro-glass beads,
titanium dioxide,
zinc oxide, or
lithopone.

10. The transaction card of claim 8, wherein the third surface area is separate from the second surface area.

11. The transaction card of claim 8, wherein the reflective element enables a visible image of the reflective element when an image is captured to preclude obtaining an image of the private information.

12. The transaction card of claim 8, wherein the reflective element includes textual information.

13. The transaction card of claim 12, wherein the textual information includes at least one of:

a name of an entity associated with the transaction card,
a textual logo of the entity associated with the transaction card, or
graphical information.

14. The transaction card of claim 8, wherein the reflective element includes a reflective material that is embedded within the transaction card as a watermark.

15. A non-transitory computer-readable medium storing instructions, the instructions comprising:

one or more instructions that, when executed by one or more processors, cause the one or more processors to:

determine a first surface area of a surface of a substrate, the substrate including a body of a transaction card or paper of a document;

determine a second surface area of the substrate, the second surface area of the substrate including private information;

calculate a third surface area of the substrate based on the first surface area of the substrate and the second surface area of the substrate, the third surface area of the substrate being an area of the substrate where a reflective element is to be applied; and apply the reflective element to the third surface area of the substrate.

16. The non-transitory computer-readable medium of claim 15, wherein the reflective element includes one or more of:

biaxially oriented polyethylene terephthalate,
aluminum,
reflective micro-glass beads,
titanium dioxide,
zinc oxide, or
lithopone.

17. The non-transitory computer-readable medium of claim 15, wherein the one or more instructions, that cause the one or more processors to apply the reflective element to the third surface area of the substrate, cause the one or more processors to:

utilize an adhesive material to adhere the reflective element to the third surface area of the substrate.

18. The non-transitory computer-readable medium of claim 15, wherein the reflective element enables a visible image of the reflective element when an image is captured to preclude obtaining an image of the private information.

19. The non-transitory computer-readable medium of claim 15, wherein the second surface area of the substrate is at a distance from the third surface area of the substrate.

20. The non-transitory computer-readable medium of claim 19, wherein the distance is calculated based upon one or more of:

a size of the reflective element,
a size of the private information, or
a size of the substrate.

* * * * *